United States Patent
Marriere et al.

(10) Patent No.: US 6,572,254 B1
(45) Date of Patent: Jun. 3, 2003

(54) HAND OPERATED ELECTRIC WHISK/MIXER

(75) Inventors: Marc Marriere, Ambrières les Vallées (FR); Jean-Yves Beaudet, Haleine (FR)

(73) Assignee: Moulinex SA, Cormelles, le Royal (FR)

(*) Notice: Subject to any disclaimer, the term of this patent is extended or adjusted under 35 U.S.C. 154(b) by 0 days.

(21) Appl. No.: 10/019,953

(22) PCT Filed: Jul. 5, 2000

(86) PCT No.: PCT/FR00/01926

§ 371 (c)(1),
(2), (4) Date: May 10, 2002

(87) PCT Pub. No.: WO01/01831

PCT Pub. Date: Jan. 11, 2001

(30) Foreign Application Priority Data

Jul. 5, 1999 (FR) .............................. 99 08755

(51) Int. Cl.$^7$ .............................. B01F 7/16; B01F 15/00
(52) U.S. Cl. .................. 366/129; 366/197; 366/279; 366/331; 366/334
(58) Field of Search ................. 366/129, 197, 366/199, 279, 331, 344; 310/50

(56) References Cited

U.S. PATENT DOCUMENTS

| | | | | |
|---|---|---|---|---|
| 3,328,001 A | * | 6/1967 | Zasdny et al. ............... | 366/129 |
| 3,533,600 A | * | 10/1970 | Gerson ........................ | 366/129 |
| 3,595,093 A | * | 7/1971 | Du Bois et al. ............. | 366/129 |
| 3,604,114 A | * | 9/1971 | Swanke et al. ............. | 30/277.4 |
| 3,619,754 A | * | 11/1971 | Fuchs ......................... | 366/129 |
| 5,316,382 A | | 5/1994 | Penaranda et al. .......... | 366/129 |
| 5,803,598 A | * | 9/1998 | Harry et al. ................ | 366/129 |
| 5,871,278 A | * | 2/1999 | Harry et al. ................ | 366/129 |
| 6,234,663 B1 | * | 5/2001 | Lecerf et al. ............... | 366/129 |

FOREIGN PATENT DOCUMENTS

FR         2730623        8/1996

\* cited by examiner

Primary Examiner—Tony G. Soohoo
(74) Attorney, Agent, or Firm—Young & Thompson

(57) ABSTRACT

Handheld electric beater-mixer including a body (2) containing a drive motor (7), a rotatable coupling device (26) connected to the shaft of the motor and adapted for the securement and driving of a mixer foot (38), which coupling device (26) communicates with the outside through a coupling opening (32), and a closure (35) associated with this coupling opening (32), wherein the closure (35) is formed by at least two flaps (46) movable between a closure position in which they are near each other, and an open position in which they are spaced from each other toward the interior of the body (2), under the direct action of the mixer foot (38) during engagement of this latter in the opening (32), the flaps (46) returning automatically to the closure position after withdrawal of the mixer foot (38).

5 Claims, 2 Drawing Sheets

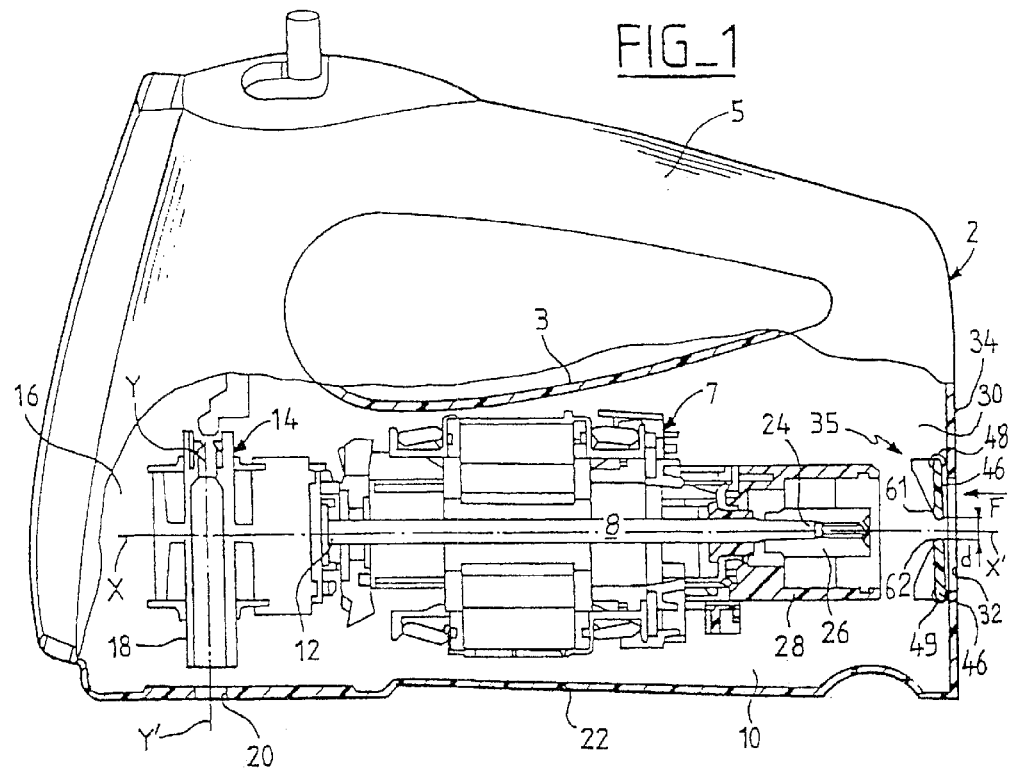
FIG_1
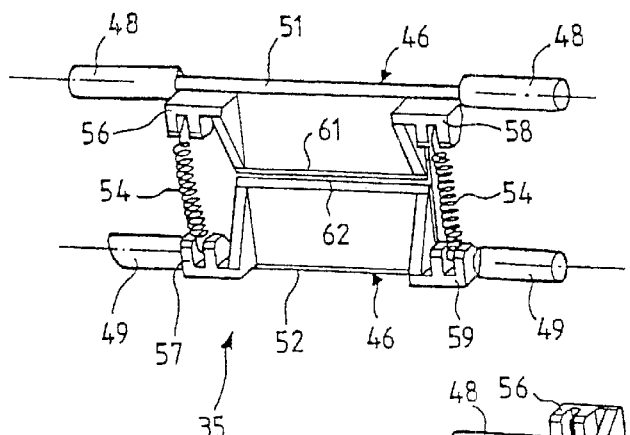
FIG_2
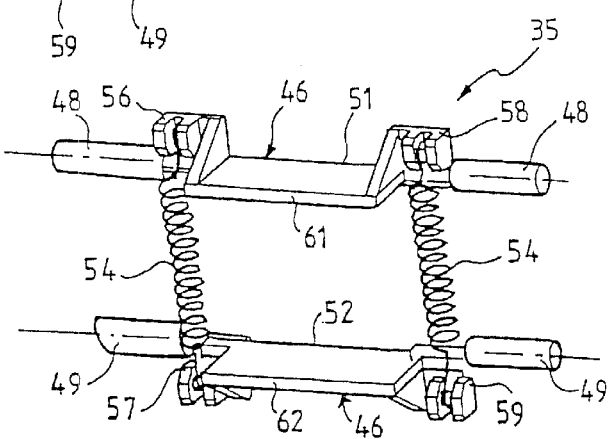
FIG_3

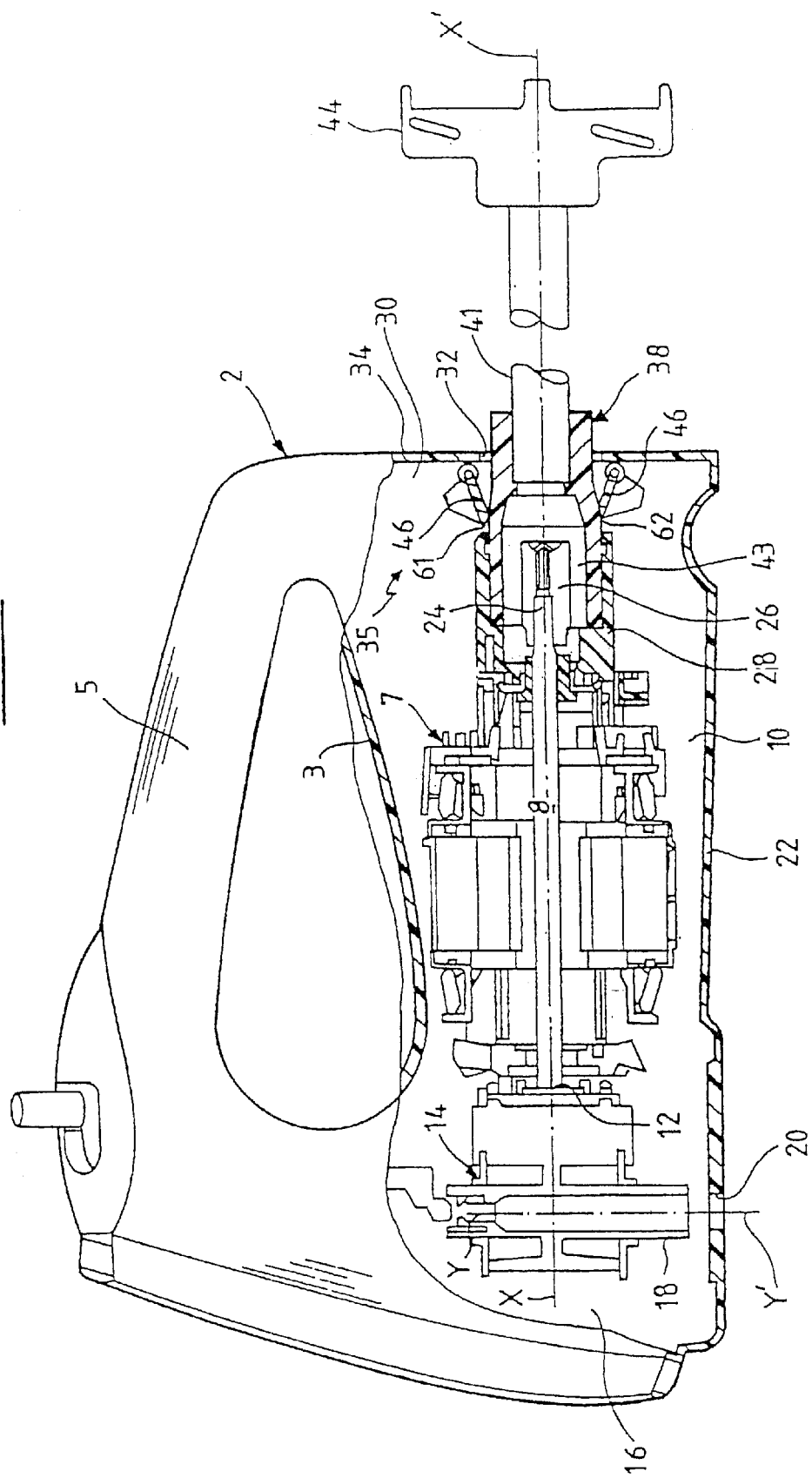
FIG_4

HAND OPERATED ELECTRIC WHISK/MIXER

FIELD OF THE INVENTION

The present invention relates to a handheld electric beater-mixer, particularly a kitchen beater-mixer, adapted to drive selectively at least one so-called beating accessory such as for example a whip, or a so-called mixing accessory turning at high speed such as for example a mixer foot, and comprising a body containing an electric drive motor, a rotatable coupling device connected to the shaft of the motor and adapted for the securement and driving of the mixing accessory, which coupling device communicates with the outside of the body through a coupling opening provided in the body and adapted for the engagement of the mixing accessory, and a closure associated with said coupling opening.

There is meant by beating accessory a working tool of the whip or blender type, and by mixing accessory an accessory with a working tool turning at high speed of the rotatable helical mixer foot type, or else of the type for a mixer bowl with a rotating knife.

BACKGROUND OF THE INVENTION

In a known apparatus of this type, the closure is generally used to protect the motor from the entry of dirt or the like in the absence of the mixing accessory and, to this end, it is made of a single piece and is mounted slidably in the body with the help of a manual manipulating element which projects through the coupling opening. The closure is thus manually movable between a closed position in which it closes the coupling opening, for protecting the motor and safety of use, and an open position in which it opens the coupling opening to permit the emplacement of the mixing accessory. This manual closure is however difficult for the user to operate.

The invention has for its object to provide a handheld electric beater-mixer, of the type set forth above, in which the closure associated with the coupling opening will be simple and easy to use, and of a design perfectly adapted for mass production.

SUMMARY OF THE INVENTION

According to the invention, the closure is formed by at least two flaps movable between a closure position in which they are adjacent each other in the absence of the mixing accessory, and an open position in which they are spaced from each other inwardly of the body, under the direct action of the mixing accessory during engagement of this latter in the coupling opening, said flaps automatically returning to the closure position after withdrawal of the mixing accessory.

Thus, thanks to these two movable flaps, it will be understood that the opening of the closure is thereafter controlled directly by the mixing accessory during its emplacement, whilst its closing is itself completely automatic, accordingly no longer requiring a manual operation to open and close the closure, contrary to the prior art, which gives the user a great facility of use and permits him even to mount the mixing accessory in the apparatus in the dark.

In a preferred embodiment of the invention, the two flaps are pivotally mounted in the body respectively about two parallel axes located on opposite sides of the axis of rotation of the coupling device and extending together in a plane transverse to the plane passing through said axis of rotation, the two flaps being urged together by resilient return means which tend to return them to the closure position after withdrawal of the mixing accessory. Such a mounting of the two flaps, like the swinging doors of a saloon, is simple to make and highly reliable.

BRIEF DESCRIPTION OF THE DRAWINGS

The characteristics and advantages of the invention will become apparent from the following description, given by way of non-limiting example, with reference to the accompanying drawings, in which:

FIG. 1 is a fragmentary vertical cross-sectional view of a beater-mixer according to the invention, without the accessory mounted;

FIG. 2 is a schematic perspective view, on an enlarged scale, of a closure in the closed position, of the beater-mixer of FIG. 1, and seen from within the apparatus;

FIG. 3 is a view identical to FIG. 2, showing the closure in the open position; and FIG. 4 is a view identical to FIG. 1, after mounting a mixing accessory.

DETAILED DESCRIPTION OF THE INVENTION

The handheld beater-mixer shown in FIG. 1 comprises a body 2 of generally substantially prismatic shape having a hollow portion 3 which delimits a handle 5, and containing an electric drive motor 7 provided with a shaft having an axis XX' and provided in normal use with at least one so-called beating accessory such as for example a whip, in the internal portion 10 of the body 2 and extending horizontally.

In the embodiment shown in FIG. 1, the shaft 8 of the drive motor 7 carries at its forward end 12 an endless screw (not shown) which coacts with two helicoidal pinions each turning about a vertical axis YY' perpendicular to the axis XX', and which forms with the latter a reducer 14. These two helicoidal pinions are located in the forward portion 16 of the body 2 and are connected respectively to two rotatable coupling devices 18 on the axis YY', of which only one is seen in FIG. 1, which communicate with the outside of the body 2 through two coupling openings 20 provided in the lower wall 22 of the body 2 and adapted for the side-by-side engagement, or one behind the other, of two whips (not shown).

In this example, FIG. 1, the shaft 8 of the drive motor 7 coaxially carries at its rear end 24 a rotatable coupling device 26 forming a drive disposed in a cylindrical well 22 which extends horizontally in the rear portion 27 of the body 2 and which communicates with the outside of the body 2 through a coupling opening 32, of circular shape, provided in the rear wall 34 of the body 2 and associated with a closure, designated by the general reference numeral 35 in FIGS. 1 and 4. This opening 32 is adapted for the engagement of a mixing accessory turning at high speed such as for example a mixer foot 38 as shown in FIG. 4, which mixer foot 38 being adapted to be secured, for example by screwing, in the well 28 and enclosing a cylindrical drive shaft 41 (FIG. 4) whose so-called front end 43, opposite the blade 44, carrying a helix (not referenced), is adapted to couple with the drive 26.

According to the invention, the closure 35 is formed by at least two flaps 46 movable between a closure position (FIG.

1) in which they are near each other and in the absence of a mixer foot, and an open position (FIG. 4) in which they are spaced from each other, toward the interior of the body 2, under the direct action of the mixer foot 38 during engagement of the latter in the coupling opening 32, the flaps 46 automatically returning to the closure position (FIG. 1) after withdrawal of the mixer foot 38.

In a preferred embodiment, the flaps 46 are two in number, having identical rectangular shape and are mounted pivotally in the body 2 respectively about two parallel axes 48, 49 (FIGS. 2 and 3) located on opposite sides of the axis XX' and extending together in a plane transverse to the plane passing through the axis XX'. With respect to FIG. 2, the two pivotal axes 48, 49 of the rectangular flaps 46 extend respectively along the two large horizontal sides, respectively the upper side 51 and the lower side 52, of the two flaps 46.

As is seen in FIGS. 2 and 3, the two flaps 46 are urged together by resilient return means constituted in the present example by two identical traction springs 54 which are each interposed and extending between two shoulders 56, 57 and respectively 58, 59 formed laterally on the flaps 46, and which extend on opposite sides of the two flaps 46 in a same direction transverse to the pivotal axes 48, 49 of the flaps.

In the stop position of the beater-mixer, in the absence of any accessory, as shown in FIG. 1, the two flaps 46 occupy a closed position in which they close the coupling opening 32 to prevent the entry of any dirt or the like, and extend, with their other large horizontal free associated sides 61, 62, facing and slightly spaced apart from each other by a distance d (FIG. 1). In their closed position, the two flaps 46 define together a rectangle in which is inscribed the circular opening 32.

To carry out the emplacement by screwing in the mixer foot, the user engages, even in the dark if he wishes, the mixer foot into the opening 32 in the direction of the arrow F of FIG. 1. With its forward end, the mixer foot 38 (FIG. 4) directly actuates the two flaps 46, against the force of the two traction springs 54, which pivot about their axles 48, 49 to move apart from each other towards the interior of the body 2, in the manner of swinging doors, as shown in FIG. 3. The two flaps 48 that have thus opened permit the screwing in of the mixer foot 38 whose shaft 41 will be coupled with the drive 26; at the end of the screwing movement of the mixer foot 38, as shown in FIG. 4, the two flaps 46 in the open position bear with their free horizontal edges 61, 62 against the forward end of the mixer foot 38.

From the mounted position of the mixer foot 38 of FIG. 4, the mixer foot can be simply withdrawn by unscrewing; upon withdrawal of the mixer foot 38, the two flaps 46 thus return, under the action of the two traction springs 54, to their closed position as shown in FIGS. 1 and 2.

What is claimed is:

1. Handheld electric beater-mixer adapted to drive selectively at least one so-called beating accessory such as for example a whip, or a so-called mixing accessory turning at high speed (38) such as for example a mixer foot, comprising a body (2) containing an electric drive motor (7), a rotatable coupling device (26) connected to the shaft (8) of the motor (7) and adapted for the securement and driving of the mixing accessory (38), said coupling device (26) communicating with the outside of the body through a coupling opening (32) provided in the body (2) and adapted for the engagement of the mixing accessory (38), and a closure (35) associated with said coupling opening (32), characterized in that the closure (35) is formed by at least two flaps (46) movable between a closure position in which they are together in the absence of the mixing accessory, and an open position in which they are spaced apart from each other toward the interior of the body (2), under the direct action of the mixing accessory (38) during the engagement of this latter in the coupling opening (32), said flaps (46) automatically returning to the closure position after withdrawal of the mixing accessory (38).

2. Beater-mixer according to claim 1, characterized in that the two flaps (46) are pivotally mounted in the body (2) respectively about two parallel axles (48, 49) located on opposite sides of the axis (XX') of rotation of the coupling device (26) and extending together in a plane transverse to the plane passing through said axis (XX') of rotation, the two flaps (46) being urged together by resilient return means (54) which tend to return them to the closure position after withdrawal of the mixing accessory (38).

3. Beater-mixer according to claim 2, characterized in that the resilient return means are constituted by two traction springs (54) which are interposed each between two shoulders (56, 57; 58, 59) formed laterally on the two flaps (46), and which extend on opposite sides of the two flaps in a same direction transverse to the pivotal axis (48; 49) of each of the two flaps (46).

4. Beater-mixer according to claim 2, in which the coupling opening (32) is of circular shape, characterized in that the two flaps (46) are identical and have a rectangular shape of which one of the large sides (51; 52) carries the corresponding pivotal axle (48; 49), and whose two other large sides are conjugated (61, 62), in the closure position of the two flaps (46), and extend facing and at a slight distance to each other, the two flaps (46) in the closure position defining together a rectangle in which is inscribed the circular coupling opening (32).

5. Beater-mixer according to claim 1, in which the mixing accessory (38) comprises a drive shaft (41) whose end is adapted to be coupled with the coupling device (26), characterized in that, after insertion of the mixing accessory (38) in the coupling device (26), the two flaps (46) in the open position bear with their free edges (61; 62) against the shaft (41) of the mixing accessory (38).

* * * * *